United States Patent [19]

Levy

[11] Patent Number: 5,612,522
[45] Date of Patent: Mar. 18, 1997

[54] ADSORPTION AND ION EXCHANGE ZEOLITE GEL MEDIA TO IMPROVE THE QUALITY AND CARBONATION OF WATER

[76] Inventor: Ehud Levy, 5933 Peachtree Industrial Blvd., Bldg. B, Norcross, Ga. 30092

[21] Appl. No.: 478,863

[22] Filed: Jun. 7, 1995

Related U.S. Application Data

[63] Continuation-in-part of Ser. No. 261,998, Jun. 17, 1994, Pat. No. 5,538,746.

[51] Int. Cl.$^6$ ..................................................... C01B 33/00
[52] U.S. Cl. ................... 204/157.4; 204/157.41; 204/157.44; 204/157.45; 204/157.5; 252/315.01; 252/315.5; 252/315.6
[58] Field of Search ............................ 204/157.4, 157.41, 204/157.44, 157.45, 157.5; 252/315.01, 315.5, 315.6

[56] References Cited

U.S. PATENT DOCUMENTS 4,550,033  10/1985  Boutin ...................................... 427/222
5,206,195   4/1993  Ando et al. ............................... 502/64

*Primary Examiner*—Elizabeth C. Weimar
*Assistant Examiner*—Cybille Delacroix-Muirheid
*Attorney, Agent, or Firm*—Penrose Lucas Albright

[57] ABSTRACT

A potassium aluminosilicate is used as a filtration media for filtering water to remove dissolved oxygen, hardness and other dissolved gases and impurities from the water, such as ammonia, hydrogen, hydrogen sulfide and sodium sulfite. The particular potassium aluminosilicate is a mesoporous amorphous material formed under ultraviolet light or sunlight to produce pore sizes of 60 Å to 250 Å at ambient temperatures (20° C.–35° C.) and in a low relative humidity (5%–20%). Sodium may be displaced in the zeolite media by potassium so that advantageous removal of impurities in the water occurs without introducing sodium into the water. The potassium aluminosilicate of the present invention may be used as a second stage filter to a first stage filter composed of strong base anion media charge with potassium carbonate or bicarbonate.

8 Claims, 10 Drawing Sheets

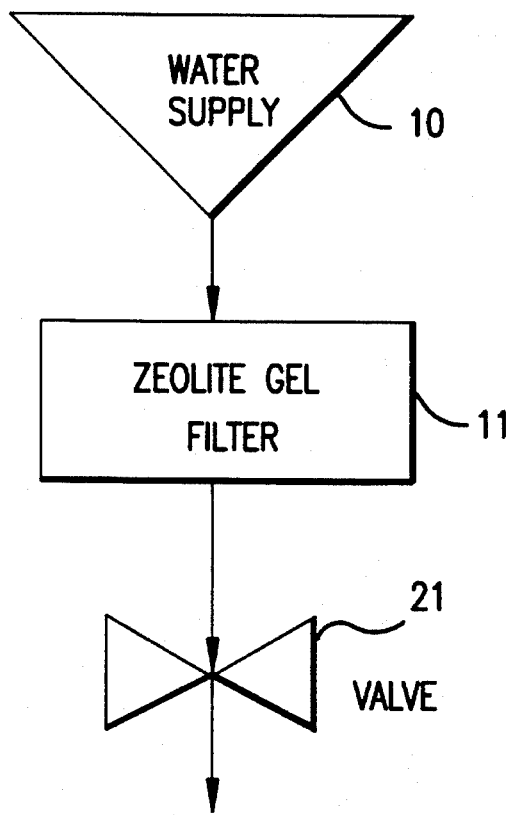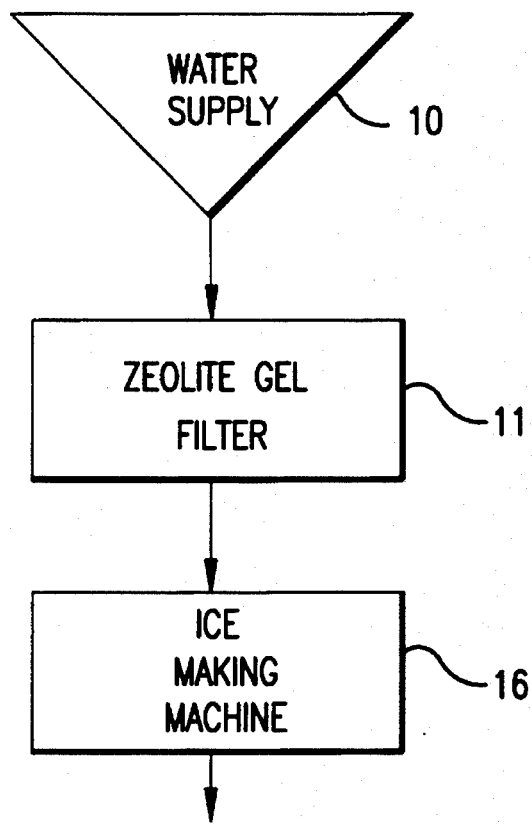

ADSORPTION AND ION EXCHANGE ZEOLITE GEL MEDIA TO IMPROVE THE QUALITY AND CARBONATION OF WATER

RELATED APPLICATIONS:

This is a continuation-in-part of Ser. No. 08/261,998 filed Jun. 17, 1994, now U.S. Pat. No. 5,538,746.

FIELD OF THE INVENTION

The invention relates to filtration of water through a potassium aluminosilicate adsorption and ion exchange media having a spongy amorphous structure. More particularly, the invention relates to a method, apparatus, filtration media and process for making the media, wherein water is filtered to remove dissolved oxygen and other dissolved gases and impurities from the water and thus improve the quality of water. Significantly, potable water filtered in this manner exhibits a further and substantial improvement in its taste and appearance when applied to ice making, hot beverage making, and water coolers and for carbonation.

BACKGROUND OF THE INVENTION

Water chemistry differs considerably from place to place; important differences exist in the amounts of dissolved oxygen, hardness, as well as in a variety of other substances and gases dissolved in and carried by the water. Water may also include suspended material, such as clay particles, and bacteriological and biological contaminants. These contaminants often adversely affect the many uses of water in society.

For instance, dissolved gases, substances and suspended contaminants unfavorably affect the quality of drinking water. Hydrogen sulfide, sodium sulfite and ammonia, present in some regional drinking waters, even in minute amounts cause the water to have an unpleasant taste. Hardness, determined by the presence of calcium or magnesium carbonate or bicarbonate or combinations thereof, affects water's taste and appearance. Also, salts dissolved in water may tend to precipitate as a scum in hot beverages, such as coffee or tea. In addition, they affect the clarity of ice when such water is frozen. Further, dissolved gases, such as oxygen, are responsible for negative consequences relative to the appearance and taste of water, the taste of hot beverages, such as coffee, as well as the pellucidity of ice. These dissolved gases, substances and suspended contaminants thus constitute a continuing problem to those concerned with the taste and appearance of water, hot beverages and ice.

Moreover, the problem is aggravated when the water is to be carbonated. The presence of dissolved gases, especially oxygen, and contaminants, particularly hardness, reduces water's capacity for carbonation. The result is that carbonated drinks are almost always less tasty because of reduced carbonation, and therefore less desirable to consumers.

Fountain beverage dispensers have been installed in bars, restaurants, drug stores and other locations on a worldwide basis which include apparatus for carbonating water received from a source of potable water, and mixing it with a flavored syrup to make a variety of soft drinks as well as alcoholic beverages. Although water may be treated at the point of use for removing or neutralizing contaminants in the local water supply, the various known and more frequently used modes of municipal water treatment do little to improve the water for subsequent carbonation.

Also, it is not uncommon to provide an apparatus for softening water at the point of use. One method of softening water is to pass it through granular zeolite, which may be a natural occurring or artificially hydrated aluminum silicate, wherein the water softening action occurs due to the zeolite replacing calcium ions from the water with the zeolite's sodium ions. However, the addition of sodium to drinking water is deleterious for those with low-sodium dietary needs. Also, for the purposes of carbonation, sodium is considered undesirable as it, primarily from 20 ppm and up, destroys carbonation and thus should not be introduced into the water prior to carbonation.

Furthermore, dissolved gases, substances and suspended contaminants serve to impair the quality of water for other uses. For example, in the food packaging industry, water is often used as a medium in which to immerse the food to be packaged and preserved. The presence of gases, especially oxygen, dissolved substances, as well as water's hardness, and suspended solids in the water medium have a pernicious effect on the preservation and taste of the packaged food. Also, the quality of water for domestic water heaters is an important concern in the industry; it is not unusual to place water softener before a hot water heater to prevent calcification of the heat transfer surfaces in area of high water hardness. But this does little to remove dissolved gases that affect the efficiency of the heat transfer surfaces and the transfer of heat to and from the water. Additionally, the removal of oxygen and other contaminants from water added to boilers for "wet lay-up" has long been an industrial requirement.

There is therefore a need for a filter that can remove dissolved gases, substances and suspended contaminants from common domestic water to improve its quality for a variety of purposes. The instant invention relates to a form of potassium aluminosilicate which has a chemical formulae of particular types of zeolite and is produced in a manner similar to the production of certain types of zeolite. However, in the operable chemical and physical formulation, typical zeolite crystalline structures has not been detected by X-ray diffraction. Yet, because of its similarities to known zeolites both chemically and in the manufacture thereof, the instant invention is considered a zeolite.

In general, zeolites are molecular sieves that are unusually crystalline, hydrated aluminosilicates of monovalent or polyvalent bases which are able to desorb water without any changes in crystal structure, and to adsorb elements and other compounds with the water removed. They are also capable of cation exchange.

Known zeolites are often formed by first a ripening or aging process for periods from several hours up to about nine days at ambient temperatures, that is, temperatures between 13° C. and 38° C. Following the ambient temperature or digestion step, the mixture is crystallized, which is accomplished generally at a temperature which may be the ambient temperature or one much higher. For example, crystallization may take place at temperatures from 20° C. to as high as 125° C. For commercial purposes, crystallization is usually effected at temperatures in the range of about 80° C. to 125° C. Not only is it more rapid, but also at lower temperatures, the resulting crystals are often smaller in size than those formed at a higher temperature.

The chemical formula for a zeolite known as zeolite Y, expressed in terms of moles of oxides, may be written as: $0.9 \pm 0.2$ $Na_2O:Al_2O_3:wSiO_2:xH_2O$, wherein w is a value greater than about three up to about six, and x may be a value up to about nine. Such zeolite is disclosed along with a number of examples in U.S. Pat. No. 3,130,007, of D. Breck, which issued Apr. 21, 1964. Although, this zeolite Y is asserted to be a particularly effective adsorbent of oxygen, my attempts to use zeolite Y, as such, to achieve an effective removal of oxygen from water have been unsuccessful.

SUMMARY OF THE INVENTION

I have discovered that particular potassium aluminosilicate gels, in particular, unique gels of amorphous formations, can satisfactorily and effectively remove dissolved oxygen and other gases and chemicals such as ammonia dissolved in the water so that the water's taste and appearance, from water coolers, ice machines or hot beverage makers, or its carbonation at soda fountains, which have been adversely affected by the quality of the drinking water, is improved markedly.

Dissolved oxygen is not an ionic species in water solution. However, it has a pair of unbonded electrons that make it a very electronegative species. It is capable of undergoing sorption/desorption mechanisms based on dipole-dipole interaction with electropositive species such as potassium aluminosilicate or potassium titanium aluminosilicate. The hypothesized interaction between dissolved oxygen and metal halide on aluminosilicate surfaces would be one which the halide is displaced by oxygen.

An aluminosilicate gel which has been used successfully for this process is made from 21% by weight of alumina hydrate type pseudoboehmiet $Al(OH)_3$ and 68% to 72% sodium silicate $Na_2O.3.22$–$2.88$ $SiO_2$, which are mixed with 11% to 14% by weight sodium hydroxide NaOH in a 5% concentration, and blended into a slurry. The slurry is filtered, washed with clean water, permitted to gel, heated with steam to initiate formation of the spongy amorphous structure, and laid over a flat bed wherein the hydrogel is formed under ultraviolet radiation (wave lengths of 2000 Å–3900 Å) at ambient temperature (20° C.–39° C.) in a low relative humidity (5%–20%) for two to ten weeks with about sixty days being typical. As a practical matter, the heat generated in this step tends to maintain the effective relative humidity in the desired range. Heat and ultraviolet radiation make the large particles intergrow to vermicular particles forming microporous spongy structures which allow water to get in and out very fast and perform ion exchange in the structure of the gel.

The alumina hydrate which is used has particle sizes for about five microns for about 75% of the material, and five to ten microns for about 100% of the material. Dispersed alumina can also be used.

Although after the gel has commenced to form, ultraviolet radiation is no longer necessary and the formation of the spongy amorphous structure can be completed without further subjecting the substance to such radiation, it is preferred that the radiation be continued until formation of the spongy amorphous structure of the zeolite gel is complete—at least to having the desired pore sizes. Preferably, intense ultraviolet radiation is provided by ultraviolet lamps.

If the presence of sodium is undesirable, when the formation of the spongy amorphous structure of the gel is complete, the gel may be washed with pure water and placed in a bath of a potassium salt, preferably potassium carbonate or, for example, potassium chloride, wherein the potassium displaces sodium in the zeolite gel.

The resulting potassium aluminosilicate is thoroughly washed with deionized (DI) water, dried and screened to produce a particle size of 8 to 60 mesh, preferably 24×40 mesh, which is packed in polyglass cylinders or cartridges, having a total volume of about forty cubic inches to about five thousand cubic inches, (cartridges of two inches inside-diameter and one foot inside-length to twelve inches inside-diameter and four feet inside-length). The resulting gel is translucent in water, but in its dry form is an opaque white, hard material similar in appearance to talc.

The cartridges are mounted in the plumbing that carries the water preferably immediately before the heating, cooling, freezing or carbonation apparatus of a hot beverage maker, water cooler, ice-maker or fountain dispensing machine, respectively.

If the potassium aluminosilicate product is subsequently neither heated nor packed too tightly, it retains surprising large pore diameters and pore volumes as well as a large effective internal surface areas. It has been ascertained that the first ten thousand gallons of water filtered through the zeolite gel of the invention had its dissolved oxygen largely, and in fact virtually entirely, removed, and the carbonation process of the apparatus was substantially improved, whereby carbonated water and beverages dispensed therefrom were equal to or better than beverages from comparable fountain dispensing machinery in areas wherein adequate carbonation of the water supply has not been considered a problem.

A cartridge of one foot inside-diameter and forty inches inside-length filled with a filtration media of potassium aluminosilicate in accordance with the invention, after filtering ten thousand gallons of water, continues to remove dissolved oxygen. But after a further fifteen thousand gallons of water have been filtered, the filter's effectiveness decreases, albeit it continues to remove up to 50% of the oxygen in the water.

In some parts of the country, the water contains high levels of sulfides, sulfates and/or sulfites which affects the carbonation and taste of soft drinks. We have discovered that the combination of a strong base anion, in the form of a first stage filter, with the potassium aluminosilicate, discussed hereinabove and in the form of a second stage filter, can produce triple the carbonation than otherwise produced without either filter. The strong base anion resin has been activated with potassium carbonate or potassium bicarbonate.

The strong base anion, which constitutes the first stage filter in this instance, is charged while substitution of sodium for potassium takes place within the potassium aluminosilicate filter, the second stage filter. The carbonate or bicarbonate is preferentially disassociated from the potassium and attracted to the strong base anion while the free potassium preferentially substitutes the sodium in the potassium aluminosilicate.

Water, with a high sulphur content, which passes through the first stage filter has the sulphur removed by ion exchange with the carbonates or bicarbonates within the strong base anion.

Many soft drinks formed by carbonation, either in the carbonator or as dispensed, such as Coca-Cola brand Coke®, have pH levels in the acidic range of around 2.5. This acidity tends to break down carbonates and bicarbonates in solution into $CO_2$. Thus, water, having carbonates or bicarbonates added thereto by sulfates reacting with the first stage filter or wherein the hardness is reduced by removal of the calcium or magnesium from carbonates or bicarbonates, displays the surprising benefit of increased carbonation when an acidic syrup is mixed therein.

Tests conducted in a high concentration of sulfate, chloride and total dissolved solids, (TDS), demonstrates that filtration units of one cubic foot of strong base anion resin placed ahead of potassium aluminosilicate increases $CO_2$ and decreases the level of sulfates for a minimum flow there through of one thousand gallons of influent.

The capacity of the potassium aluminosilicate filtration media in accordance with the invention for oxygen removal is between fifteen and forty-five ounces of oxygen per cubic foot of the filtration media. At the same time, the filter removes virtually all ammonia ions in the water. If hydrogen sulphide is present, it is also removed. Also, a reduction was found in the levels of calcium bicarbonate, calcium, sodium sulfite, hydrogen, copper and zinc, when present.

In Miami, Fla., bitterness of municipal water was eliminated.

These results relating to the filtration of water by potassium aluminosilicate are truly unexpected and astounding and suggest to one skilled in the art that my invention has utility far beyond the improvement of carbonation, ice, hot beverages or cooled water. The novel and improved result provided by the invention, including the filtering process, the apparatus, and method of making the potassium aluminosilicate for use in the process, as such, and its combination in the filtering process with a strong base anion filtration media charged with carbonate, are the primary objects of the invention. However, other objects, adaptabilities and capabilities of the invention will be appreciated, as the description progresses, reference being had to the accompanying drawing in which:

BRIEF DESCRIPTION OF THE DRAWINGS

FIG. 5 is a schematic representation of a potable water system utilizing a potassium aluminosilicate filter in accordance with the invention for removing dissolved oxygen and other dissolved and suspended gases and substances from the water supply prior to use;

FIG. 6 is a schematic representation of an ice-making system, including a potassium aluminosilicate filter for removing dissolved oxygen and other dissolved and suspended gases and substances from the water supply prior to freezing according to the present invention;

DETAILED DESCRIPTION OF THE PREFERRED EMBODIMENTS

Figure 1:
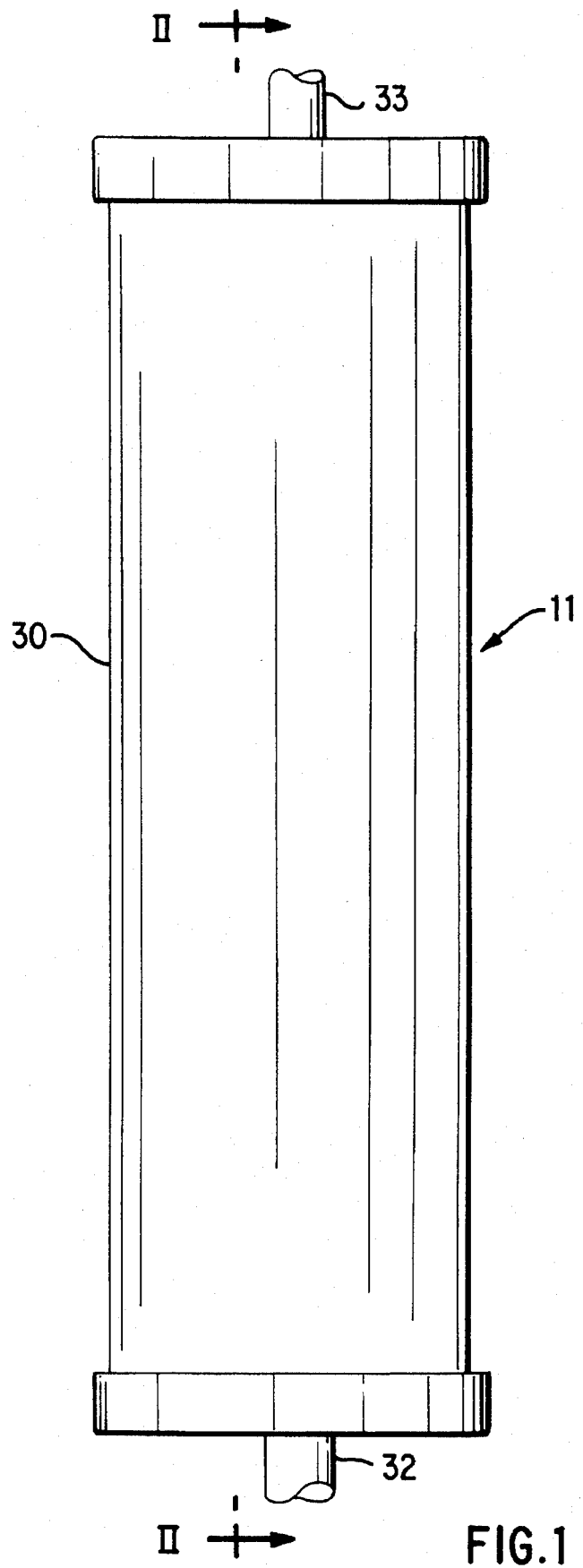
FIG. 1 is an elevational side view of the filter of the present invention.

Filter 11, shown in detail in FIG. 1, is comprised of at least one canister 30, and zeolite gel media 35, (shown in FIGS. 2 and 4), contained therein.

Canister 11, as depicted in the Figures, is intended broadly to represent any filter cartridge known in the industry that can be adequately pressurized, is hygenically acceptable, and has sufficient capacity to contain the desired quantity of zeolite media 35, (and, if desired, a sufficient quantity of anion media 36), has at least one inlet port 32 and one outlet port 33 both to be connected via water-tight coupling to water pipes, and to provide a flow-path for water which flows from inlet port 32 through zeolite media 35, (and, if desired, through the anion media 36) to outlet port 33.

Fifty micron screens 34 are provided at inlet 32 and outlet 33 ports to prevent media 35 (and, if desired, between media 35 and media 36 to prevent media 35 from mixing with media 36) from flowing out of canister 11. Of course, other methods, known to those skilled in the art, to prevent media 35 (and, if desired, anion media 36) from flowing out of canister 11, (or mixing), which also allows an acceptable flow-rate of water therethrough, can be substituted.

Figure 2:
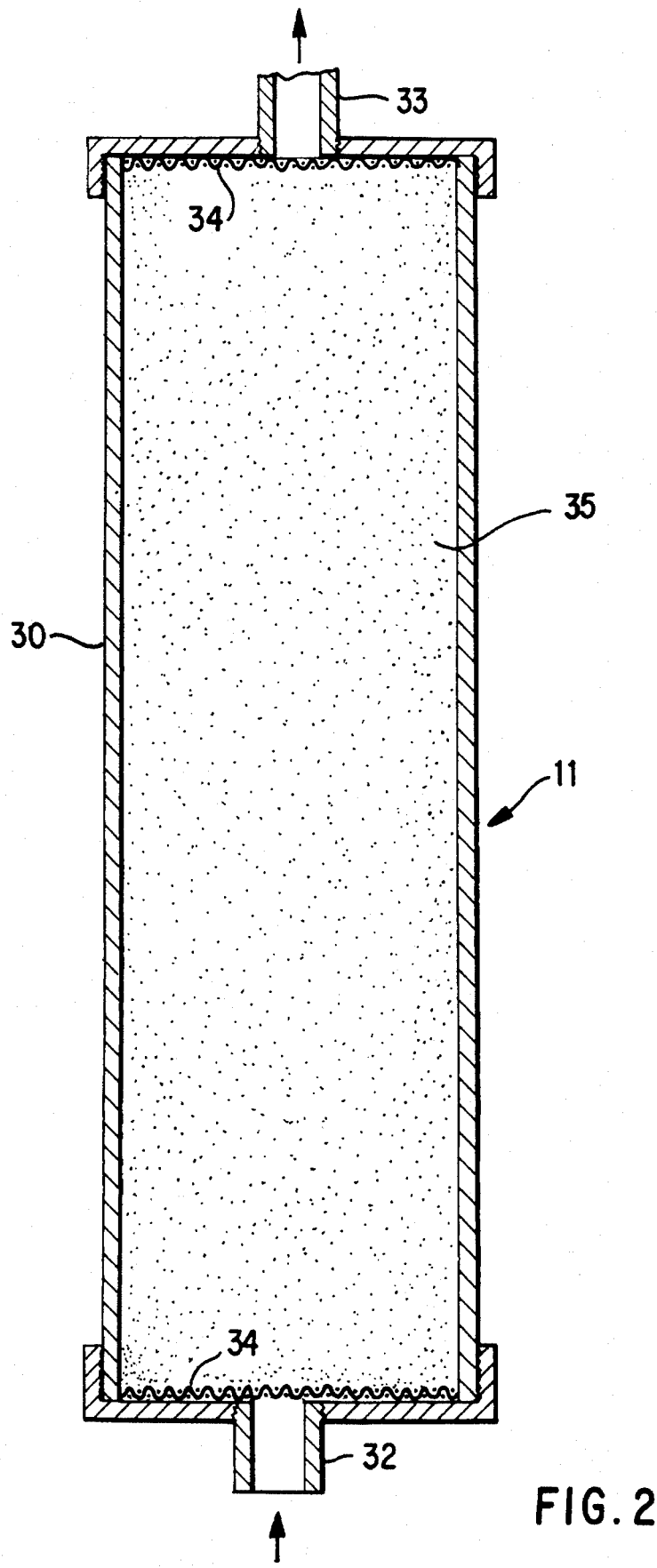
FIG. 2 is a sectional view of the filter shown in FIG. 1 taken along section lines II—II.

Canister 11 is filled with zeolite media 35, as shown in FIG. 2, without being highly compressed when filter 11 is assembled.

Referring to the FIGS. 1–2, filter 11 normally comprises a volume of about fifty cubic inches to two and one half cubic feet of zeolite gel 35 in accordance with the invention. Two and one half cubic feet of filtration media 35, placed in polyglass cylinders or cartridges 11 of types well known to the trade (or several cartridges 11 disposed in parallel), is capable of treating 10,000 gallons or more of water. In a typical system, influent water was found to have from 5.6 mg/L to 6.2 mg/L dissolved oxygen. Effluent water from filter 11, however, contains virtually no measurable amount of dissolved oxygen after 10,000 gallons at a flow rate of three gallons per minute.

The volume selected for filter 11 depends upon the local water conditions, the flow rate and the quantity desired, and how often it is convenient to change filter 11. For most installations, cartridges 11 containing 2000 cubic inches of filter media 35 are adequate and are replaced after periods of time varying from a few months to a year. But for soft drink plants, filter media 35 may be held by stainless steel or glass-lined tanks, rather than cartridges, wherein filter material 35, as such, is periodically replenished. The capacity of such tanks is normally in the range of twenty-five to five hundred cubic feet.

Figure 3:
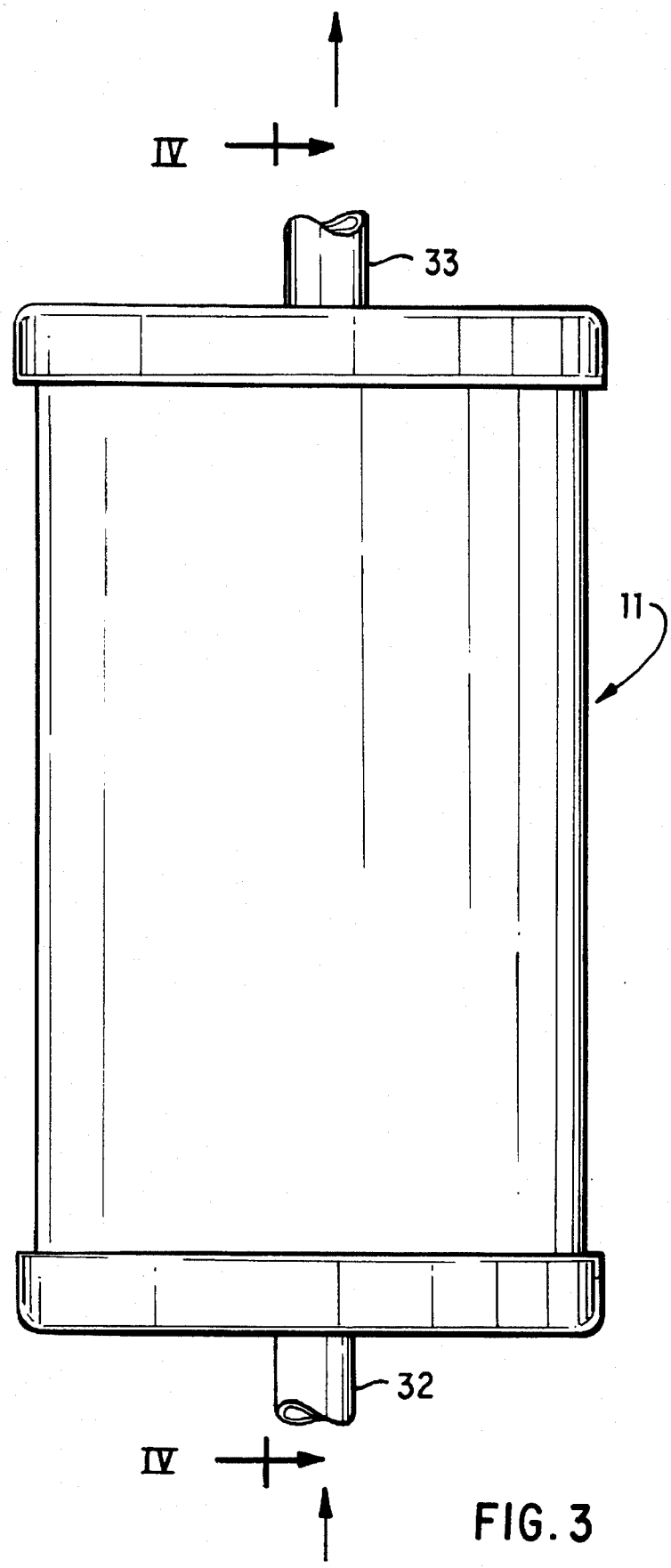
FIG. 3 is an elevational side view of an alternative embodiment of the filter of the present invention wherein a strong base anion is placed in the filter before the potassium aluminosilicate gel media.
Figure 4:
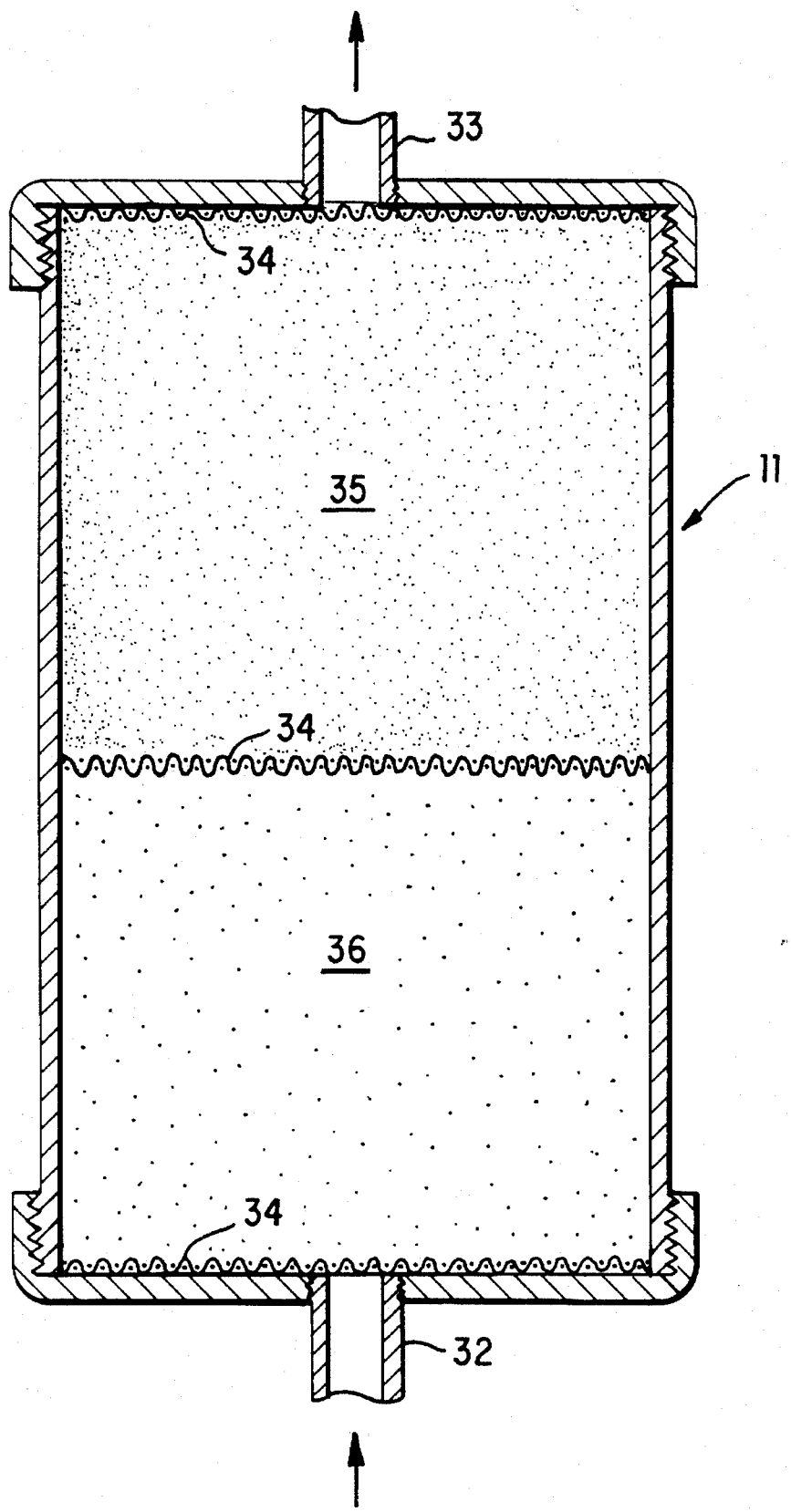
FIG. 4 is a sectional view of the filter shown in FIG. 3 taken along section lines IV—IV.

Referring now to FIGS. 2–4, strong base anion media 36 may be advantageously provided as a first stage filter in series before zeolite gel 35, (which is now a second stage filter), in areas wherein the municipal domestic water contains large amount of sulfides, sulfates and/or sulfites. Small amounts of these sulfur-related ions give drinking water an unpleasant taste. This is particularly so wherein the drinking water is mixed with an acidic soft drink syrup, such as Coca-Cola brand Coke®. Tests have shown that 200 ppm of sulfate in the water used for a Coca-Cola® beverage imparts an adverse taste to the soft drink.

A strong base resin 36 is placed in cartridge 11, which is appropriately increased in size to accomodate both resin 36 and gel 35, between inlet port 32 and zeolite gel 35 in a manner so that water entering cartridge 11 must first pass through a sufficient amount of resin 36 before entering gel 35. Resin 36 is separated from gel 35 by 50 micron partition 34.

Of course, other methods and apparatus known to those skilled in the art for confining resin 36 and gel 35 may be substituted. For example, filter 11 may comprise two cartridges 11 placed in series, (with screens 34 at their respective ports), the first containing resin 36 and the second containing gel 35.

The volume required for strong base resin 36 is essentially the same as that required for zeolite gel 35. Hence, under normal circumstances, the volume of filter 11, when a suffiecient amount of both zeolite gel 35 and strong base anion 36 are to be placed in it, is essentially twice that when zeolite gel 35 is used alone.

Referring now to FIG. 5 which illustrates the advantageous use of filter 11 in conjunction with potable water supply 10. Potable water received from water supply 10, which may be any appropriate source, passes through filter 11 for removal of dissolved and suspended gases, including oxygen, and other contaminants for softening water received through valve 21.

Referring now to FIG. 6, water from water supply 10, passed through filter 11, is used for producing ice in ice machine 16, whereby the ice cubes so formed from the filtered water have the benefit of an unusually high pellucidity due to the virtual absence of dissolved gases and other contaminants in the water. In addition, ice formed in ice machine 16 from the filtered water improves the taste of most beverages into which it is introduced due to the elimination of impurities. In this instance, ice machine 16 produces ice that is particularly adaptable for making ice tea and ice milk or for use in circumstances wherein it is desirable for the ice to be clear.

Figure 7:
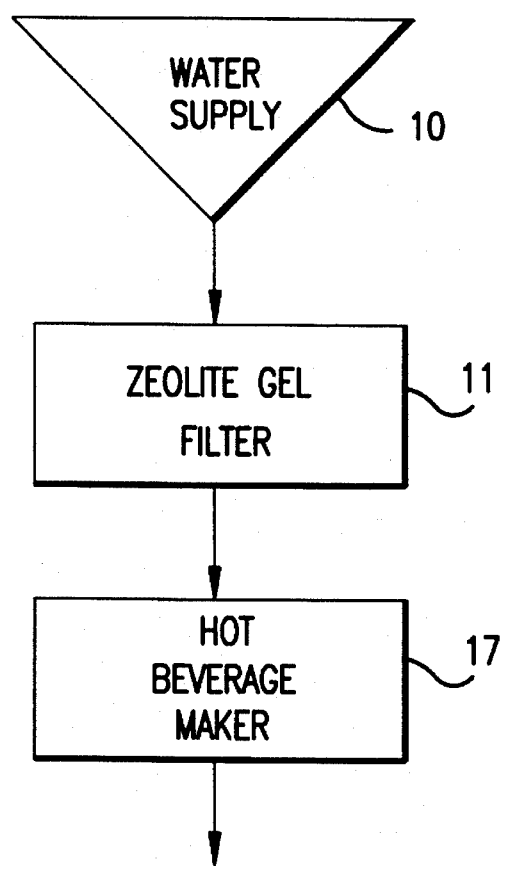
FIG. 7 is a schematic representation of a hot beverage making system, including a potassium aluminosilicate filter for removing dissolved oxygen and other dissolved and suspended gases and substances from the water supply prior to heating same according to the present invention.

In FIG. 7, water from water supply 10, having passed through filter 11, is used to provide water to hot beverage maker 17 which may, for example, broadly represent a hot plate with a pot containing the water thereon, a percolator, an automatic drip system or an espresso/cappuccino maker, each of which may be used to make a coffee, tea or cocoa beverage with improved taste and appearance due to the elimination or reduction of oxygen and the other substances from the water by filter 11.

Figure 8:
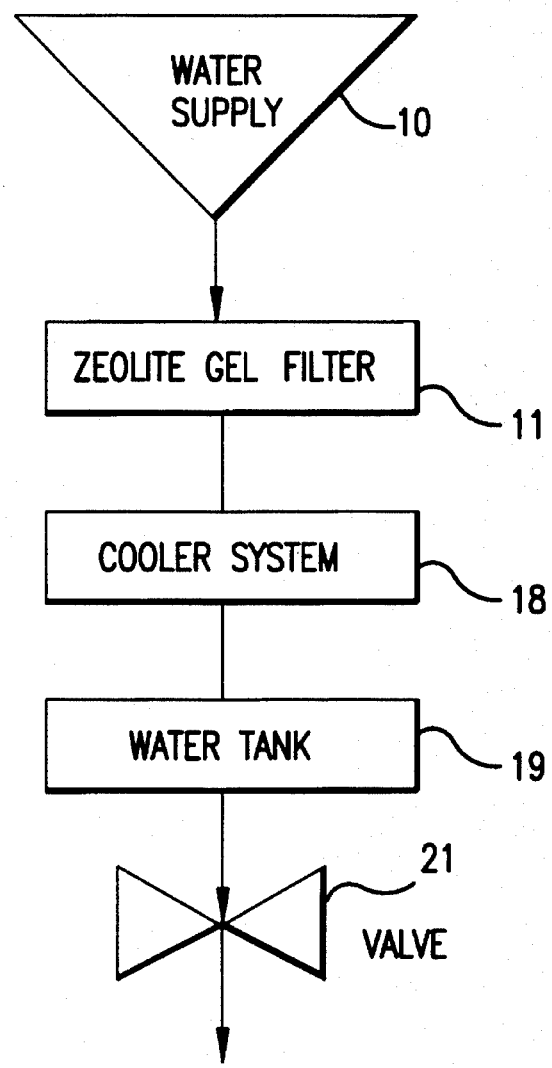
FIG. 8 is a schematic representation of a water-cooler system, including a potassium aluminosilicate filter for removing dissolved oxygen and other dissolved and suspended gases and substances from the water supply prior to cooling the water according to the present invention.

Again, as shown in FIG. 8, filter 11 receives water from water supply 10 and transmits it to cooler system 18 which, in turn, dispenses the water, with improved taste and appearance due to the elimination or reduction of oxygen and other substances from the water by filter 11, via an insulated tank 19, from which the cooled water is drawn through valve 21, if open. If valve 21 is closed, the water remains in tank 19.

Figure 9:
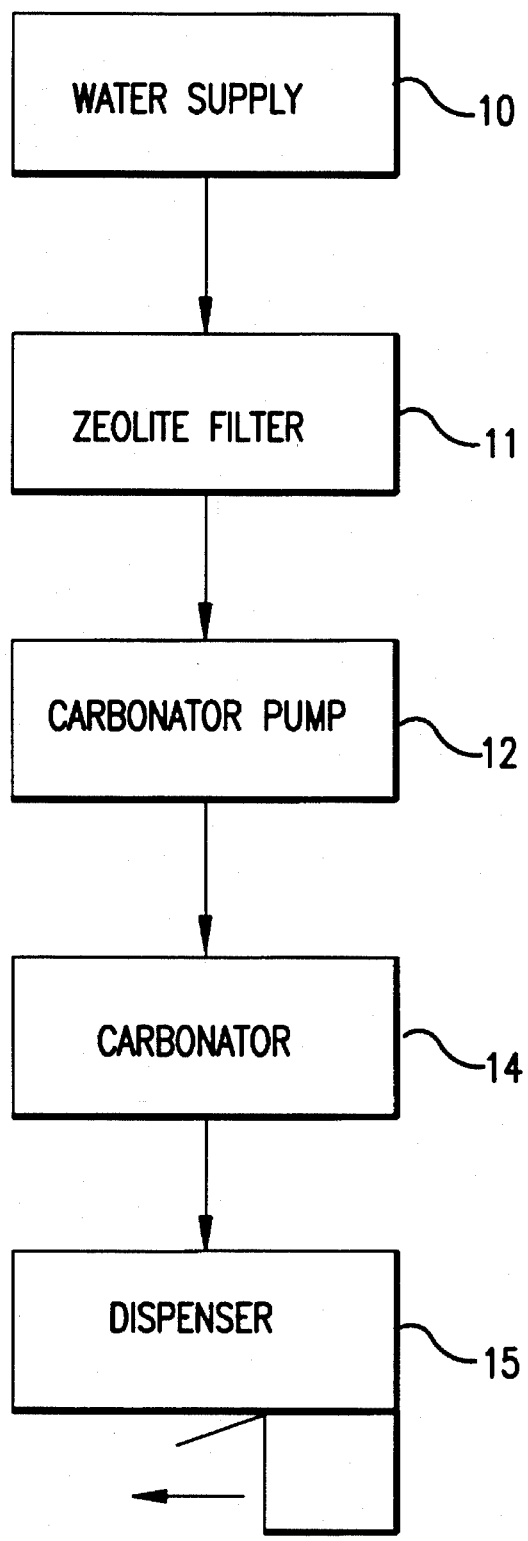
FIG. 9 is a schematic representation of a post-mix carbonated beverage system, including a potassium aluminosilicate filter for removing dissolved oxygen and other dissolved and suspended gases and substances from the water supply prior to carbonation according to the present invention.

Illustrated in FIG. 9 is a post-mix carbonated beverage system which includes filter 11 for rapid treatment of water from a water supply 10 before the water is received by the carbonation system comprising a carbonator pump 12 and a carbonator 14. Carbonated water is received from carbonator 14 by a dispenser 15.

Between carbonator 14 and dispenser 15, a reservoir or strainer, or both, are sometimes provided. They are not, however, essential to practice the present invention.

With the usual type of carbonation system, it is customary for water to be conveyed to a carbonator 14 from any suitable source via an appropriate pumping or pressurizing arrangement 12, which may be the pumps of the municipal water system if sufficiently powerful, whereupon pump 12 is not necessary. Once the water reaches the carbonator, it is carbonated with $CO_2$ under a pressure that is usually in the range of thirty to seventy-five pounds per square inch. From carbonator 14, carbonated water is supplied to a dispenser 15, where it is blended with a beverage syrup and dispensed as a high quality beverage.

In general, the mixture of carbonated water and syrup is in a proportion of five to one, although other desired proportions can be selected as long as absolute uniformity and high quality result. The $CO_2$, which is normally dissolved under a pressure of two to five atmospheres in carbonator 14, causes the effervescence in the carbonated beverages received from dispenser 15. Depending upon the types of syrups used, the syrups may also be added to carbonator 14 before being received by dispenser 15. In such case, it is customary for a soft drink fountain to have several carbonators 14 and dispensers 15, one for each flavor, and one for carbonated water without flavor.

Carbonation is improved as a result of the filtration through the zeolite gel 35 by substantial amount, 1.9 to 3.9 volumes of carbonation, for example. Regardless of the liquid temperature, carbonation is improved 30% to 100% using the present invention. For example, unfiltered water at 33° F. and at pressure of 20 psi has the capacity to absorb four volumes of $CO_2$. However, the same volume of $CO_2$ absorption can be achieved from 40° F. to 55° F. with use of zeolite gel media 35 to filter the water, although otherwise a volume of 2.0–2.2 $CO_2$ is normally found. Also, carbonation in the serving container is maintained twice as long at many locations around the country where municipal water contains high levels of TDS and gases which would have had serious adverse affect on the carbonation. Tests conducted in Houston, Texas reveal that the dispensed soft drinks without the zeolite gel 35 lose fifty percent of their carbonation within one hundred and twenty seconds while water processed with zeolite gel 35, in accordance with the invention retains its carbonation twenty times longer.

Referring to FIG. 3–4, strong base anion 36, that has been charged with carbonate or bicarbonate, is be advantageously added to filter 11 of zeolite gel in accordance with the invention, to form a primary ion exchange media for use in areas s of high domestic water sulphur content. The anion resins and the zeolite gel are both generated by being charged in series with a 5% solution of $K_2CO_3$ or $KHCO_3$. The carbonate or bicarbonate of the strong base anion ionically exchange and remove the sulfates or sulfites from the water passed through the anion resin of filter 11. When the water so treated is mixed with a soft drink syrup to form a soft drink having an acidic pH of about 3.5 or less, the carbonates and bicarbonates in the water break down to form $CO_2$ increasing the carbonation of the soft drink.

Used zeolite gel 35 is reactivated by being heated sufficiently, (but not more), to desorb previously adsorbed fluids and gases, including oxygen, and washed with a five (or greater) percent solution of NaOH or NaCl, or if the presence of sodium is undesirable, (as it often is), with a five (or greater) percent solution of $K_2CO_3$, $KHCO_3$, KCl, or other potassium salt as would occur to one skilled in the art, to effect an ion exchange with magnesium and calcium ions in the zeolite gel 35, which were previously removed from the water flowing through the filtration media in the course of the filtration process. The reactivated zeolite gel 35 is roughly 80% to 90% as effective as the unused zeolite gel 35 and may be reused as reactivated or with unused media mixed therein in various proportions. Using $K_2CO_3$ or $KHCO_3$, when a primary ion exchange media of strong base anion filter 36 is used in the system, as illustrated in FIGS. 3–4, provides the additional benefit of recharging strong base anion filter 36 with carbonate or bicarbonate at the stone time as the filtration medium of filter 11 is regenerated.

Figure 10:
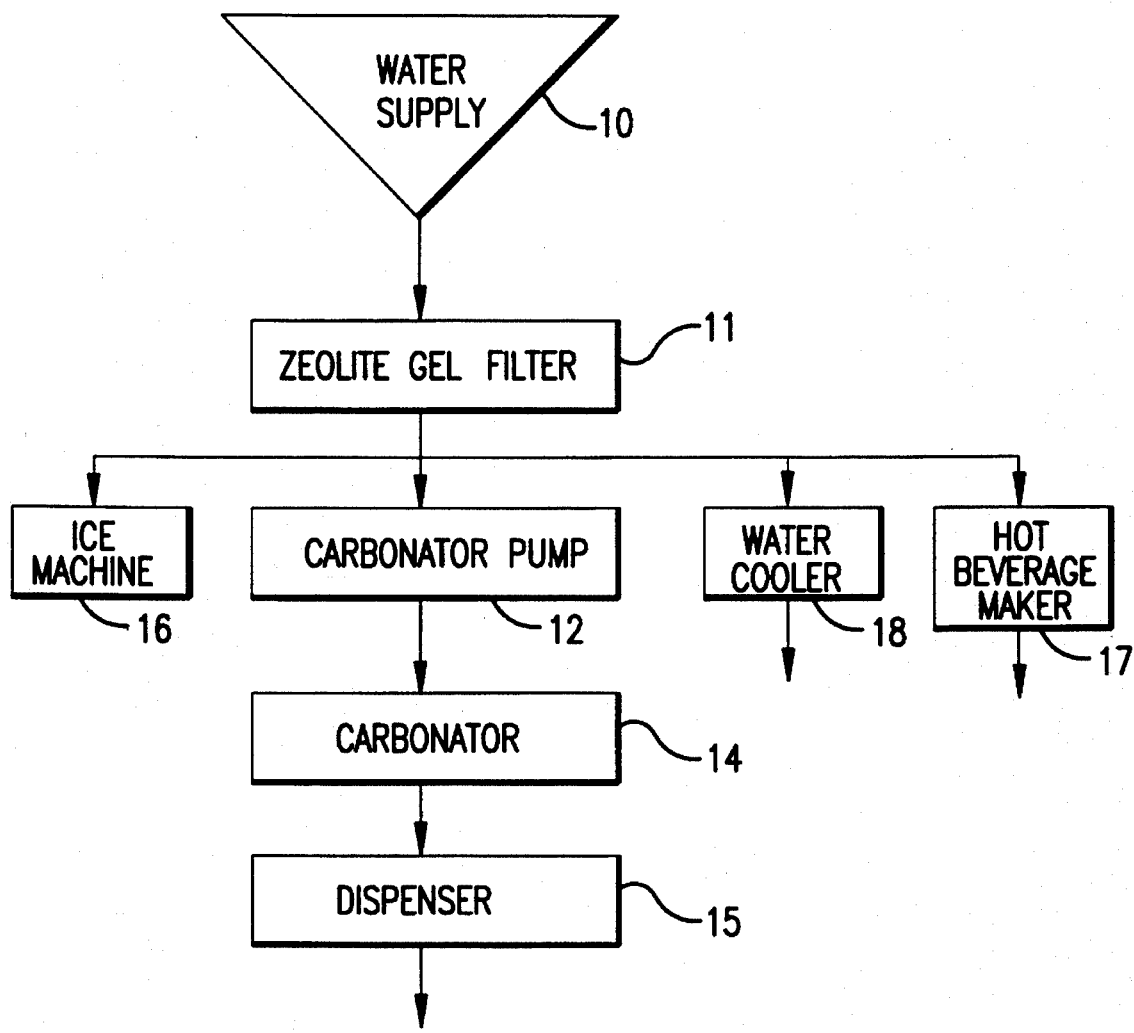
FIG. 10 is a schematic representation of a post-mix carbonated beverage system, having branch conduits to an ice machine, a hot beverage system and a water cooler, including a potassium aluminosilicate filter for removing dissolved oxygen and other dissolved and suspended gases and substances from the water supply prior to carbonation, freezing, heating and cooling according to the present invention.

Referring to FIG. 10, an ice machine 16, hot beverage making device 17, water cooler 18, and/or carbonator 14, in any combination, separately draw their water through filter 11, whereby the volume of the zeolite gel 35 (or, if desired, and strong base anion 36) in filter 11 is advantageously increased proportionately or more, dependent upon how much water the components are using. Here, as in other embodiments, filter 11 may constitute a plurality of cartridges, containing the zeolite media 35, (or containing a strong base anion media 36 in appropriate combination with the zeolite media 35), which are connected in parallel.

Strong base anion resin 36 is composed of commercially available anion resins which are strongly basic in character. Specific examples include resins available from Rohm & Haas Co. under the trademark IRA, and from the Purolite Company under the trademark Purolite A. The resin is charged with a carbonate or bicarbonate, preferably a 5% solution of potassium carbonate. A charging bath of potassium carbonate solution provides a convenient method of charging resin 36 and gel 35 simultaneously.

Chemically, the zeolite gel 35 of instant invention comprises by weight 10%–21% alumina trihydrate, ($Al_2O_3 \cdot 3H_2O$), and 68%–82% sodium silicate, ($Na_2O \cdot 2.88$–$3.22 \, SiO_2 + 2$–$4 \, H_2O$), the remaining percentage being initially sodium hydroxide (NaOH). If the sodium in the zeolite is considered undesirable, it is subsequently exchanged for potassium by means of washing the aluminosilicate with solution of potassium chloride or potassium carbonate or potassium bicarbonate sufficient to displace all or a major portion of the sodium in the hydrated aluminosilicate with potassium.

Figure 11:
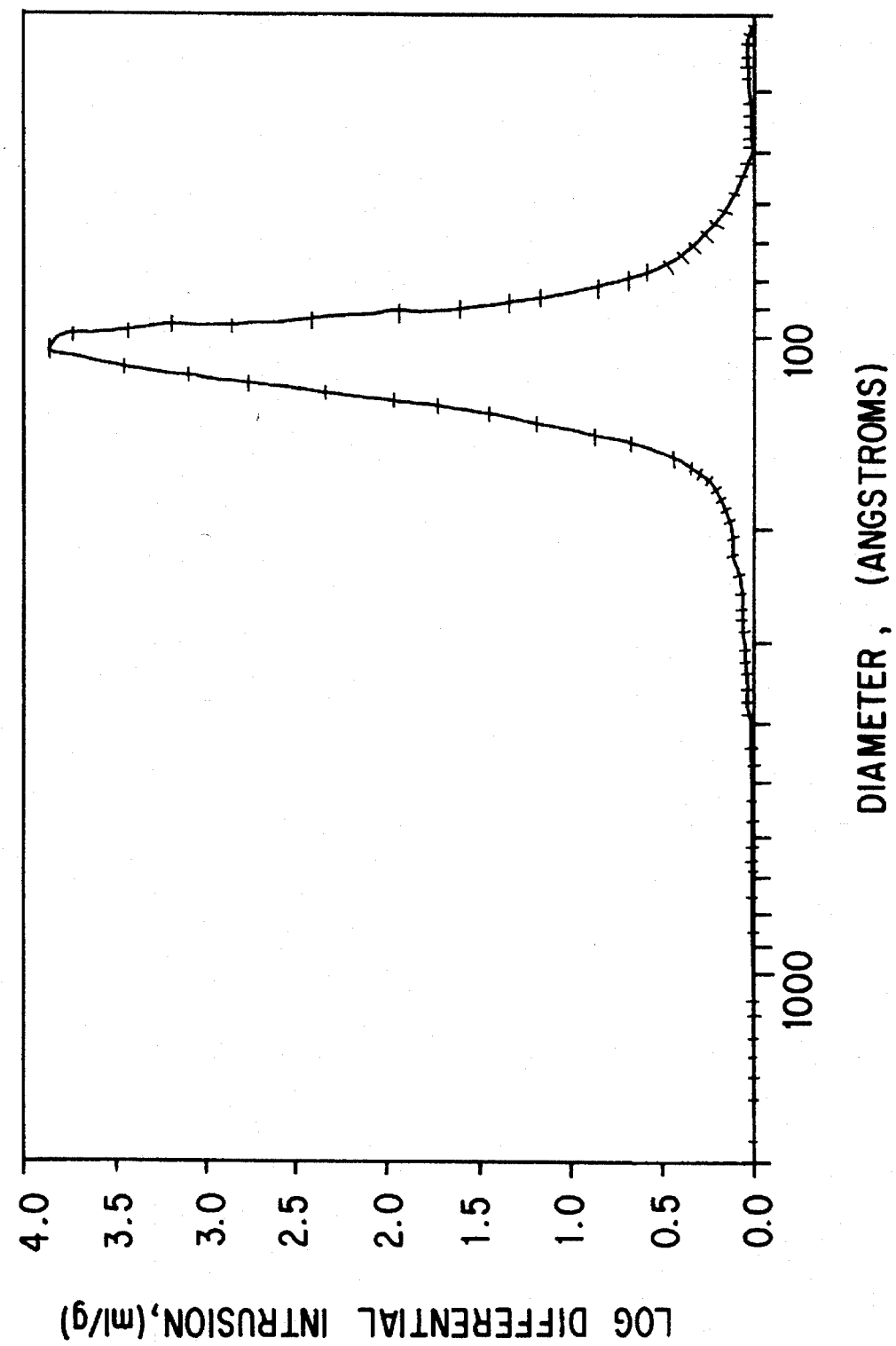
FIG. 11 is a graph of an analysis of a potassium aluminosilicate according to the invention which utilizes mercury intrusion to depict log differential intrusion in milliliters per gram for the material's pores by diameters expressed in Angstroms.

The effective pore sizes of the gel are much larger than in known sodium aluminosilicate zeolite forms, having typical diameters of between about 60 Å and 250 Å, as shown in FIG. 11.

Instead of applying heat, (except for a relatively short period before, or to commence formation of the spongy, porous amorphous structures of the zeolite in its initial gel form), the mixture is exposed to comparably intense ultraviolet radiation in the range of 2000 Å to 3900 Å wavelengths, or to natural sunlight. Use of artificial ultraviolet radiation causes a much more rapid formation of the spongy, porous amorphous structure than sunlight where three to six weeks may be required to produce large spongy amorphous structures.

Although both methods are operable, in accordance with the invention, zeolite gels 35 produced by formation of the spongy amorphous structure under ultraviolet lamps are considered distinct from those produced in accordance with the invention under sunlight in that the former's pores are more uniform in size and the spongy amorphous structure of the zeolite is more predictable and has comparably less variations. An average pore diameter as great as 180 Å and average pore volume of 0.79 ml/g have been achieved with an extremely high uniformity of pores. Typically, the surface area of the zeolite filtration media is in the range of 175 to 450 square meters per gram of the media.

The formation of the zeolite gel 35 in accordance with the invention can be time consuming. Both the time required to produce the spongy, porous amorphous structures and their quality appears to be affected to a substantial degree by the purity of the initial material, the temperature at which the process is carried out, and the intensity of the ultraviolet radiation. Two to ten weeks may elapse before the spongy, porous amorphous structures are completely formed, uniform and stable. Their pore diameters and volumes, if the zeolite gel 35 is subsequently heated above 200° C., are substantially reduced. The same occurs if too much pressure is applied to the zeolite gel 35 material.

It is not entirely clear why the zeolite gel 35, which is produced in accordance with the invention, has the capacity to adsorb as much of the oxygen dissolved in water as it does. All zeolite molecular sieves in spherical form I have tested immersed in water do not remove oxygen from the water in adequate amounts. They have lost (or immediately lose) 100% of their adsorption capacity. If the zeolite gel 35 product, in accordance with the invention, is subsequently heated to temperatures substantially above 200° C., its capacity to adsorb dissolved oxygen in water at flow rates of between one and seven gallons per minute is substantially reduced.

Also, if the ratio of alumina to silica is increased, although general ion exchange capacity increases, oxygen adsorption is reduced. Based on this, it is thought that amorphous silica alma gel with potassium is a key player in the reduction of oxygen and hydrogen, but without ion exchange, it will not function.

Further, it is theorized that in the radiation of the zeolite gel 35 under ultraviolet light, cross-linking by shared oxygen atoms of the three-dimensional frameworks of $SiO_4$ and $AlO_4$ tetrahedrons is incomplete, or that the potassium cations which are formed are preferentially selective for oxygen atoms. In either event, or for whatever reason, zeolite gel 35 made and used in accordance with the invention exhibits a surprising capacity to remove large amounts of dissolved oxygen from the water that is a prime cause for reduced carbonation of water, adverse tastes and reduced clarity of ice and altered taste and appearance of hot and cold beverages in various areas of the United States.

In trials of the invention, as indicated above, the filtration media contained in the filtration units of between 40 cubic inches and 2.5 cubic feet of zeolite gel 35 media dramatically improved the carbonation of water that had a considerable mount of dissolved oxygen in its water supply. In at least one test using a large cartridge, (twelve inches inside-diameter by forty inches inside-length), over 22,000 gallons were involved wherein the flow rate was one to seven gallons per minute. The zeolite gel 35 filter continued, even after the 22,000-gallon point was reached, to remove dissolved oxygen from the water, albeit at a reduced rate of about fifty percent.

The substitution of potassium for sodium offers a favorable medium for ion exchange within the zeolite gel 35 wherein the water is thereafter carbonated. In studies of the use of the present invention, a reduction of calcium content, calcium bicarbonate content and water hardness of 100% occurred. This is believed due to ion exchange between the water's calcium ions and the potassium ions of the zeolite gel 35. The undesirable addition of sodium prior to carbonation of water, as was the case in the previous use of zeolite to soften water, is thus avoided. Of course, the free carbonate and bicarbonate ions, when subsequentially placed in an acidic solution through the mixing of the soft drink syrup with the treated water, provide the added benefit of increased carbonation due to the carbonates and bicarbonates breaking down to form $CO_2$.

For reducing hardness and dissolved gases, the present invention can also be used advantageously in conjunction with ice makers (as shown in FIG. 6 and 10), to produce ice with improved clarity, water for water coolers (as shown in FIG. 8 and 10), having an improved taste and appearance, and water for hot beverage makers (as shown in FIG. 7 and 10), to prevent the precipitation of calcium in the hot beverage and to reduce dissolved oxygen in the water to provide a better taste.

Further, it has been found that hydrogen sulfide is reduced 100%, ammonia and sodium sulfite are reduced 90% to 100% and other impurities, such as zinc and copper, are reduced by adsorption into the zeolite gel 35.

In addition, the adsorption of gases into the zeolite gel 35 during the filtering operation tends to destroy micro-organism growth within or on the structure of the media.

Furthermore, it has been found that potassium can be regenerated within the zeolite gel 35 after exhaustion and, as regenerated, the filtration media maintains 80% to 90% of its original capacity.

The dramatic results of these findings lead one skilled in the art to conclude that the utilization of this invention to any application where the quality of water is important, not only in respect to impurities and hardness but also dissolved gases and particularly oxygen, is desirable.

The invention is illustrated by the following Examples:

EXAMPLE I

Commercial water glasses composed of 8.9% by weight $Na_2O$ and 28.7% by weight $SiO_2$, the remainder $H_2O$, were blended with 21% of $Al(OH)_3$ in crystalline powder form. Eleven percent by weight of sodium hydroxide (0.929 moles of NaOH per liter) was added and mixed until homogeneous. The mixture was transferred to a spongy amorphous structure formation tank where it was cooked with a steam batch (100° C.–200° C.) for 10–16 hours. The resulting gel was then placed into two-inch deep Pyrex trays, the depth of the gel therein being about one inch (2.5 cm).

Thereafter, the gel was exposed to continuous and intense ultraviolet radiation from both above and below the trays while formation of the spongy, porous amorphous structure proceeded for seven days until formation of the spongy, porous amorphous structure was complete.

The resulting gel spongy, porous amorphous structures were sized and screened to produce zeolite particles between 8 and 60 mesh. For uses wherein the presence of sodium in the zeolite gel 35 was considered detrimental, such spongy, porous amorphous structures were placed in 36 liters of 5% solution of KCl for 0.2 hours which was maintained at a temperature of 20° C. to effect a complete substitution of potassium for sodium in the gel.

The resulting material was washed with 200 liters of clean water until pH of 8.5 was measured.

The zeolite gel 35 product had a total pore volume of 0.73 cc per gram and a surface area of 175 square meters per gram. The pore diameters were 100 Å to 250 Å, peaking at 160 Å.

Using twenty kilograms of media 35 to filter municipal water at a flow rate of three gallons per minute, the following removal of dissolved oxygen occurred:

| Gallons of water | 100 | 500 | 2000 | 3000 |
|---|---|---|---|---|
| Influent water (dissolved oxygen) | 5.6 mg/L | 6.2 mg/L | 6.1 mg/L | 5.7 mg/L |
| Effluent water (dissolved oxygen) | 0 | 0 | 0 | 0 |

Thereafter the water was received in a carbonator where the volumes of carbonation were increased from 1.9 (without $O_2$ removed) to 3.9 ($O_2$ removed).

Figure 12:
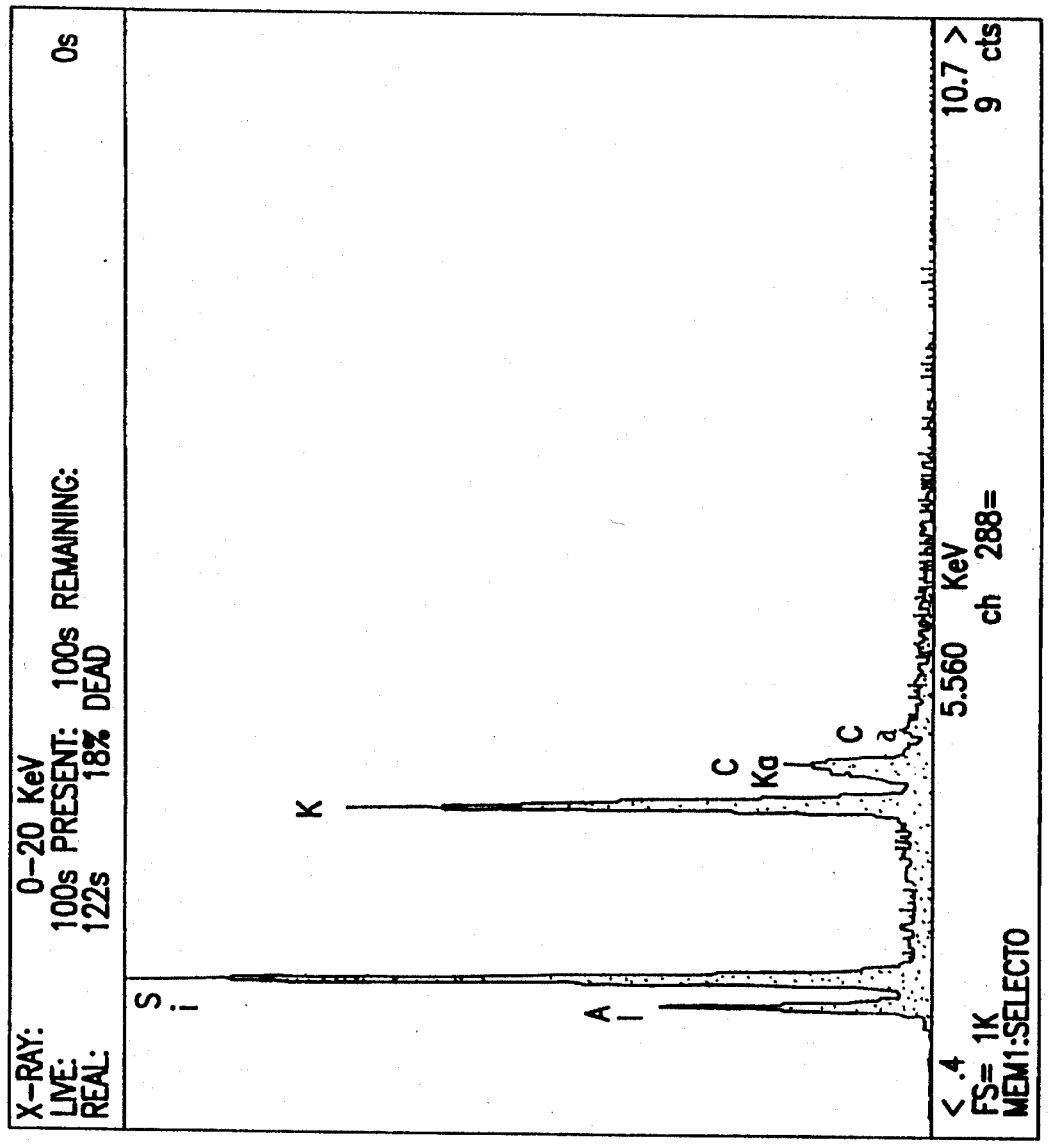
FIG. 12 is an X-ray diffraction pattern of the product presented in EXAMPLE I.

X-ray diffraction pattern of the dry sample is shown in FIG. 12. Peaks labelled Si denote the X-ray diffraction of the standard used, $CaF_2$, Al denote impurities due to the testing equipment, and C denotes the crystalline material. From FIG. 12, it is seen that less than 1% of the sample from EXAMPLE I is crystalline.

EXAMPLE II

Amorphous silica gel in 8×40 mesh, 5000 gram weight with 24 liters of water, mixed with 1100 gram weight of dry pellet sodium hydroxide and 800 gram weight alumina boemite was placed in an autoclave to create hypothermal reaction at 150° C. for 2–6 hours to produce amorphous silica gel zeolite. The forming gel was dried for ten days and washed with DI water and then charged with an ion exchange wash to replace sodium for potassium. Final product in dry form had the following weight percentages: Alumina, 7.90%; Potassium 10.00%; and $SiO_2$ 81.00%; the remaining percentage water.

Oxygen reduction using the filtration media of the sample of EXAMPLE II was less than obtained by the sample from EXAMPLE I.

The zeolite gel 35 product of EXAMPLE II compared, however, closely insofar as pore volume, pore area, and pore diameters are concerned with Example I.

In a still further example, the alumina to silica ratio was lowered in the zeolite gel 35 to where the alumina weight is 14% and the silica weight is 72% to 76%. With silica weight to alumina weight ratio of seven to one, the zeolite gel proved to have 20%–40% more capacity for gas where total dissolved solids and hardness of the water is in the low levels or if the pH of the water exceeds 8.

FIG. 11 is a graph which illustrates the distribution of pore diameters of a sample, wherein the pore diameters were between 60 Å and 250 Å, peaking at about "Zeolite gel" as used in the specification and claims, except as otherwise indicated, refers to an amorphous aluminosilicate material considered to encompass or be the equivalent of mesoporous molecular sieves having pore diameters within the general range of four to fifty nanometers.

Although I have described the preferred embodiments of my invention, it is to be understood that it is capable of other adaptations and modifications in the scope of the appended claims. For example, advantageous use of the present invention can be found in the food packaging and preserving industry, for household and commercial plumbing and hot water systems, for the use and care of boilers and in the chemical industry. Instead of the initial steam heating treatment, microwave radiation can be substituted to shorten the period involved. Also, although within the ambit of this invention, sodium and potassium are not considered equivalents for the preparation of foods and beverages for human consumption, for other purposes wherein they and other chemicals are known to be of an equivalent nature, they may be substituted for them.

Having thus disclosed my invention, what I claim as new and desire to secure by Letters Patent of the United States is:

1. In the production of synthetic potassium aluminosilicate, wherein a sodium silicate solution and an aluminate solution are combined to form a gel containing $Na_2O$, $Al_2O_3$, $SiO_2$ and $H_2O$ said gel comprising a porous amorphous structure, the improvement which comprises exposing said gel to ultraviolet radiation for at least a sufficient period to commence formation of the porous amorphous structure of said gel, said gel forming into an aluminosilicate product having pore diameters which are at least about 60 Angstroms to about 250 Angstroms.

2. A process in accordance with claim 1, wherein the temperature that said gel forms upon being exposed to said ultraviolet radiation is maintained within a range of 25° C. to 39° C.

3. A process in accordance with claim 1, wherein the relative humidity during the formation of the spongy amorphous structure of the gel is maintained between 5% and 20%.

4. A process in accordance with claim 1, wherein the relative humidity is maintained at about 20% or less.

5. A process in accordance with claim 1, wherein potassium is added to said potassium aluminosilicate to displace said sodium therein.

6. A process in accordance with claim 1, wherein said ultraviolet radiation is within a range of about 2000 Angstroms to about 3900 Angstroms.

7. A process in accordance with claim 1, wherein said ultraviolet radiation comprises sunlight.

8. A process in accordance with claim 1, wherein an ultraviolet lamp produces said ultraviolet radiation.

* * * * *